United States Patent [19]

Miller et al.

[11] Patent Number: 4,912,476
[45] Date of Patent: Mar. 27, 1990

[54] ANTENNA INTERFACE COMMON MODULE

[75] Inventors: Larry J. Miller, South Jordan; Glen D. Rattlingourd, Salt Lake City; Clifford T. Johnson, Sandy, all of Utah

[73] Assignee: Unisys Corporation, Blue Bell, Pa.

[21] Appl. No.: 730,119

[22] Filed: May 3, 1985

[51] Int. Cl.$^4$ .................... G05B 11/18; G01S 3/44
[52] U.S. Cl. .................................. 342/359; 318/600
[58] Field of Search ............... 342/359, 356, 352; 318/603, 601, 602, 600

[56] References Cited

U.S. PATENT DOCUMENTS

| | | | |
|---|---|---|---|
| 4,118,705 | 10/1978 | Varley | 343/359 |
| 4,495,453 | 1/1985 | Inaba et al. | 318/603 |
| 4,588,936 | 5/1986 | Itoh et al. | 318/603 |
| 4,599,547 | 7/1986 | Ho | 318/603 |

*Primary Examiner*—Stephen C. Buczinski
*Assistant Examiner*—Mark Hellner
*Attorney, Agent, or Firm*—Glenn W. Bowen; Robert S. Bramson

[57] ABSTRACT

An improved interface arrangement between an antenna controller and one or more antennas. The interface includes a reduced number of control lines but is capable of handling complete interface requirements including control and status between the antenna controller and the antenna.

13 Claims, 1 Drawing Sheet

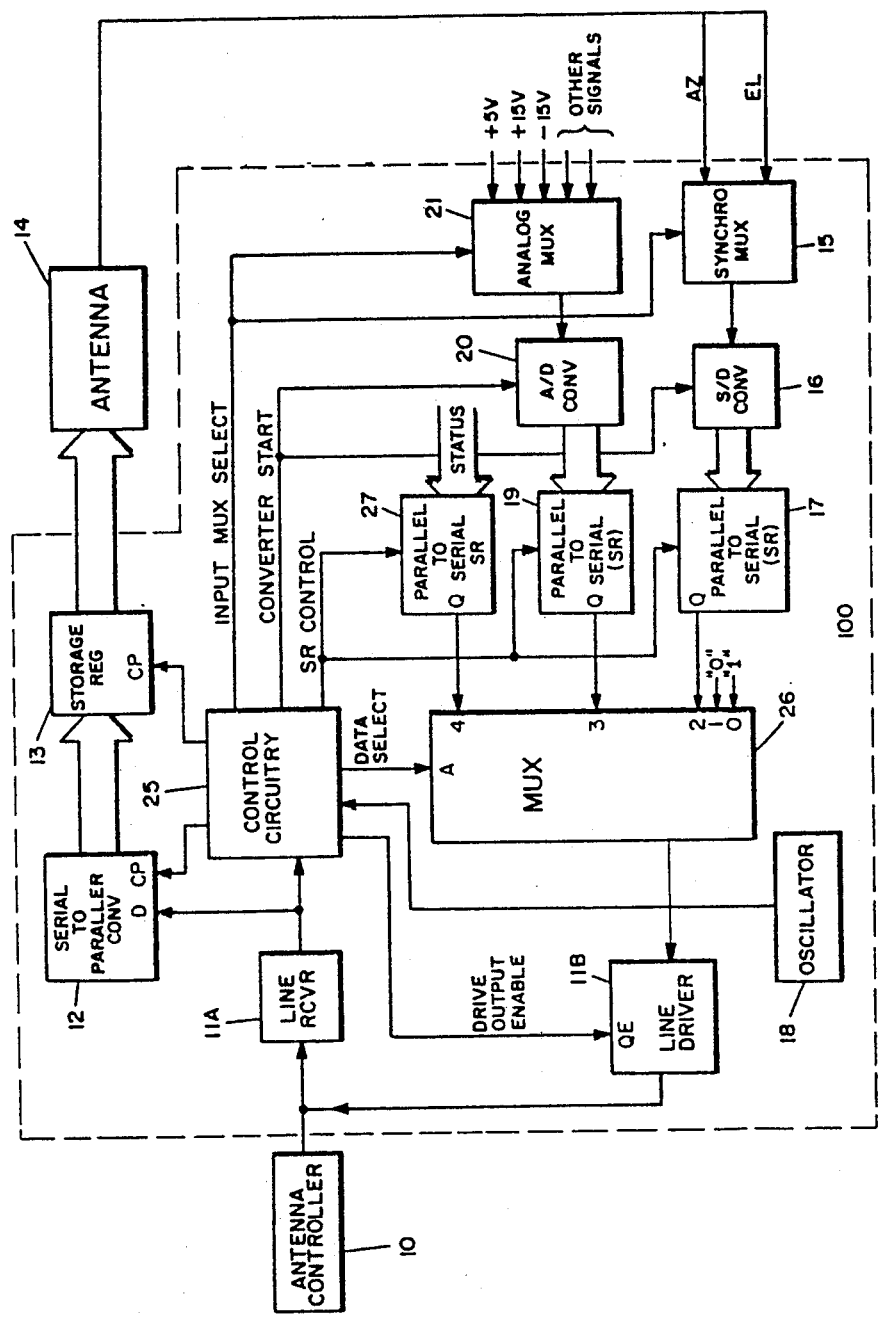

ANTENNA INTERFACE COMMON MODULE

BACKGROUND

1. Field of the Invention.

This invention is directed to antenna systems, in general, and to the interface portion of the system which is disposed between the antenna controller and the antenna, in particular.

2. Prior Art.

There are many antenna systems which are known in the prior art. These antenna systems may include any number of antennas and controllers therefore. The antennas can be arranged to response only to the controller (painting mode) or to respond and track the signals received by the antenna (tracking mode).

In the instances where the antenna is controlled by a controller, the interface system between the controller and the antenna is, frequently, a very complex and cumbersome apparatus or device. These shortcomings are usually encountered as a consequence of the number of signals which are to be transmitted between the controller and the antenna. In the prior art systems, these cumbersome interfaces or buses tend to add complexity, weight and expense to antenna systems, in general. When the systems are used in airborne applications, the additional weight is a significant problem. The complexity increases the problem of servicing such systems in the airborne environment. The additional expense is a feature which any user wishes to reduce.

Moreover, when the interface system is complex, the situation becomes even more of a problem when the number of antennas which is to be controlled increases. Consequently, it is highly desirable to provide a system which overcomes these disadvantages and produces a light weight, simple, and relatively inexpensive interface system.

SUMMARY OF THE INSTANT INVENTION

This invention is directed to an interface circuit which is used between an antenna controller and an antenna system or unit. In particular, using the interface system of this invention permits the actual interface line to be comprised of a single wire between the controller and the antenna and yet maintain control and status capability. In addition, up to four antennas can be controlled using the bus feature of this circuit.

BRIEF DESCRIPTION OF THE DRAWINGS

The sole Figure in this application is a block diagram of the antenna interface circuit of the instant invention.

DESCRIPTION OF A PREFERRED EMBODIMENT

Referring now to the sole Figure, there is shown a block diagram of the antenna interface circuit of the instant invention. The actual interface portion of the circuit is shown within the dashed outline 100. This interface is connected between the antenna controller 10 and the antenna system 14 with the interface portion in the middle.

In the embodiment shown and described herein, antenna controller system 10 operates on a serial word format as will be described hereinafter. This controller circuit controls the communication link between the antenna module and the antenna controller, per se.

The antenna 14 can represent a plurality of four antennas up to, in this instance, although such antenna requires an antenna interface. Of course, it is possible that more than four antennas can be ultimately controlled by this interface. However at this time, this is all that is required. In greater specificity, the antenna system 14 is defined in terms of the antenna motors wherein the signals supplied thereto will direct the motors (and thus the antenna system) to slew up, down, left or right.

In the system of the instant invention, the controller 10 is connected along the serial input line which comprises a single pair of wires connected to the line receiver 11A and to the driver circuit 11B. It will be noted that in the preferred embodiment, the receiver circuit 11A is normally ON and enabled in order to operate on signals received from the antenna controller 10. Conversely, the driver circuit 11B is disabled until signals are to be supplied from antenna 14 to the controller 10. This arrangement permits rapid signal transfer and convenient control over the signal transmission.

The circuit 11A is connected, via a bus, to the serial-to-parallel converter 12 and to the input of the control circuitry 25. In particular, the receiver 11A is connected to the D input of converter 12 which can take the form of a serial-in, parallel-out shift register. The outputs of the converter 12 are connected to the inputs of the storage device 13 which can be another shift register. In particular, the storage device 13 operates to store the command information which is received from the antenna controller via the line receiver circuit 11A and the shift register 12. (While it is not essential, the preferred embodiment of this invention operates on a 16-bit word format.) The synchronization of the input information is controlled by control circuit 25 which supplies clock signal CP to both of the registers.

The command words which are supplied to the antenna device 14 by register 13 are, in particular, supplied to the drive mechanism associated with the antenna. Typically, this drive mechanism comprises stepping motors which are driven to advance or reverse in accordance with the digital signals which are supplied thereto. For example, in one embodiment, the motors drive the antenna shaft by approximately 0.01 degree per digital word.

In the antenna feedback loop, the position of the antenna is monitored. In particular, the position of the antenna is detected and sampled by synchro-transmitters and synchro-to-digital converters. These signals are referred to as the synchro signals. In particular, signals are used to detect the azimuth and the elevation of the antenna as defined by the respective synchro transmitters. These signals are referred to as the AZ and the EL signals.

The feedback signals are supplied to the synchro multiplexer 15 which receives the synchro signals and supplies same to the synchro/digital converter 16. That is, in response to the "input Mux select" control signal from the control circuit 25, the synchro MUX selects which of the feedback synchro signals is to be passed therethrough to the S/D converter 16.

The S/D converter 16 converts the analog synchro signal to a digital signal and supplies same to the storage register 17 in response to the "Converter Start" signal from the control circuit 25. The storage register 17 a parallel-to-serial register is continuously updated by the signals from the feedback loop via the MUX 15 and the converter 16. The interface unit periodically transmits the antenna position and I/F status to the antenna controller. The sequence is to sample, convert and transmit the AZ position, then the EL information, followed by the A/D values (e.g. voltages and the like). This sequence is controlled by the multiplexers. Thus, the most current status or information signal at the feedback loop is always provided to the MUX 26 for ultimate transmission to the antenna controller 10 via the line driver circuit 11B and the associated bi-directional bus.

Another input to the MUX 26 is supplied by the analog-to-digital converter 20. The A/D converter 20 is connected to receive a number of reference or proportional input signals via analog MUX 21. These input signals, in this embodiment, represent various signals such as a +5 volt signal, a ±15 volt signal, a rectified and filtered 26 VAC signal and any other appropriate signals. The analog MUX circuit 21 is connected to receive reference monitoring signals from the antenna system 14 and the interface unit so that the status of these respective signals can be observed. Clearly, if one or more of these signals is defective or deficient, the operation of the antenna system 14 can be adversely affected. The Analog MUX 21 is also triggered by the "Input MUX Select" signal from the control circuit 25.

Likewise, the A/D converter 20 is triggered by the "converter start" signal from the control circuit 25. The signals from A/D converter 20 are supplied to MUX 26 via parallel-to-serial register 19. Other discrete signals (referred to as status signals that may be important to determine the status of the Antenna or the Antenna Interface are supplied to MUX 26 via parallel-to-serial register 27. Registers 17, 19 and 27 are all triggered by the SR Control signal which is supplied by control circuit 25 thereby to store the outputs of the S/D and A/D converters and also the status bits. These registers also serially shift out the contents at the appropriate times.

Multiplexer 26, thus, receives signals from the sift registers 17, 19 and 27. In addition, binary "1" and "0" signals are supplied to the MUX inputs. The input signal which is passed through MUX 26 to line driver 11B is controlled by the Data Select signal which is supplied to MUX 26 by control circuitry 25. In particular, the Data Select signal essentially "steps" through the several inputs, including the binary 1 and 0 signals, thereby to continuously update the antenna controller via the line driver 11B which is selectively enabled by control circuit 25. By including the binary 1 and 0 signals, an address signal is provided to identify the signals which are supplied to the antenna controller 10.

A crystal oscillator 18 provides a highly accurate basis for producing the alignment or clock signals in the circuit. The crystal oscilator 18 is connected to a buffer within control circuit 25 to establish the preferred clock signal and, as well, to shape this clock signal in the appropriate fashion.

The clock signal, which is used to clock all of the appropriate circuit portions in the system, is also supplied by the control circuit 25 in order to clock the appropriate signals therethrough. In the preferred embodiment, the control circuit 25 is triggered on the leading, positive-going edge of the clock signals supplied by line receiver 11A.

In operation, the circuit module is capable of receiving up to eight individual analog channel signals. The input voltages on these channels shall have the values between 0 and +40 volts DC or 0 and −50 volts DC depending upon the types of signals and logic which are used in the circuit.

The interface line between the antenna and antenna controller is a bi-directional bus which maintains both control and status of the antennas. This bus operates with a differential type voltage level signal which has low and high values of approximately −1.0 and +5.5 volts DC uses a Manchester code or any other suitable coding scheme.

The interface signal between the antenna controller and the antenna consists of a Command Word which is ultimately supplied to the antenna and Data Words which are supplied to the antenna controller. The Interface Signal has the following format:

| Command Word | Data Word 1 | Data WD 2 | Data WD 3 | Data WD 4 | Data WD 5 |
|---|---|---|---|---|---|
| To Antenna ⟶ | ⟵ From Antenna ⟶ | | | | |

Thus, it is clear that the controller issues the Command Word to the antenna and then assumes the receive operation wherein it accepts status from the antenna. The status is represented by the Data Words (Data WD).

In particular, the sequence for the interchange is that the antenna controller first transmits the Command Word to the antenna. The appropriate antenna recognizes the Command Word and immediately upon receipt of the last bit of the Command Word, begins to transmit the five Data Words (Data WD 1-5) to the antenna controller. The antenna controller receives these Data Words and uses the information represented thereby in calculating the next antenna Command Word. This operation then continues, in sequence, so that control of the antenna is achieved.

In analyzing the Command Word, it has been noted that the preferred embodiment uses a 16-bit format. The particular format is as follows:

COMMAND WORD

| Bit No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Value | "1" | "0" | A0 | A1 | UP | DN | L | R | ⟵ | | | SPARE | | | | ⟶ |

In this format, bits 1 and 2 are the binary "1" and "0" pattern which is used to synchronize the clock to the input data stream as described hereinafter. Bits 3 and 4 represent the antenna address for up to four antennas. Bits 5 through 8 are the slew commands which indicate the direction in which the antenna is intended to move. Bits 9 through 16 are spares which can be used to send any additional information which may be needed in particular application.

The time interval between the transmission of successive frames is, in this embodiment, 100 microseconds as a minimum. The control circuitry 25 receives the Command Word noted above, align the clock signal using the "1-0" pattern, and strobes the data into register 13.

It also detects the 100 microsecond interval and sets the clock alignment circuitry in the control circuitry 5 to be initiated at the positive going edge of the next input data bit. After the antenna interface has received the 16 command-bits from the antenna controller, the antenna control circuitry 25 activates line driver 11B and the antenna controller deactivates its line driver therein. Thus, the Data Words are then transmitted from the antenna system 14 to the antenna controller 10. It is clear that the clock signal supplied by the control circuit 25 is used to strobe data out of the antenna interface in the same fashion as it was used to strobe the Command Word into the antenna.

It should be noted that, similar to the Command Word, each Data Word comprises 16 bits. In each of these words, bits 1 and 2 represent the binary values "1" and "0", respectively. These bits are used to trigger and identify to the antenna controller that a Data Word is being presented. In the case of Data Word 1, bits 3 through 16 represent the antenna azimuth. In Data Word 2, bits 3 through 16 represent antenna elevation. In Data Word 3, bits 3 through 9 represent the +5 volt signal while bits 10 through 16 represent the +15 volt signal. In Data Word 4, bits 3 through 9 represent the −15 volt signal and bits 10 through 16 represent the 26 volt reference signal. In the case of Data Word 5, bits 3 through 16 represent spares which can be used for additional voltage or status bits that may be desired or required in other applications.

It should be noted that the slew command, i.e. bits 5 through 8 in a Command Word, are operable to cause the stepper motors in the antenna unit 14 to drive the antenna in the specified direction, i.e. left, right, up or down. Again, as noted, the stepper motors can be stepped 0.01 degree per bit in this slew Command Word.

The module of this invention is capable of receiving the Command Word from the antenna controller 10 and is operable to decode the command bits and produce a drive pulse which is supplied to the antenna stepper motor in accordance with the content of the coordinates which are drived from the antenna controller 10. Thus, it will noted that a slew command is indicated by a binary "1" in the appropriate position. Conversely, no action is indicated by a binary "0" in the appropriate location in the Command Word.

In like fashion, the module is operable to format the status signal as noted above and to transmit the data contained therein to the antenna controller 10 in accordance with the clocking arrangement supplied by the crystal oscilater clock signal provided by clock 13 and buffer 19.

As noted above, the crystal controlled oscilater and the clock circuit which includes this oscilltor produces an output signal of the frequency of 1 MHz±25 Hz in this embodiment.

Thus, there is shown and described a unique interface module circuit which is used in controlling the antennas. This module permits control of a plurality of antennas, if desired, and require only a single bi-directional, interface line while permitting accurate control over the antenna position. The embodiment shown and described herein includes a plurality of circuits and components which have been described. Each of these circuits and/or components has characteristics which have been described relative to a preferred embodiment. Moreover, this system arrangement lends itself to LSI or VLSI fabrication techniques and also permits the antenna controls to be placed near the antennas, per se, in order to reduce possible signal degradation and distortion, as well as system complexity. It is understood that those skilled in the art may conceive modifications or alterations to the embodiments shown and described herein. However, any such modifications or alterations which fall within the purview of this description are intended to be included therein as well. The instant description is intended to be illustrative only and is not intended to be limitative. Rather, the scope of this application is limited only by the claims appended hereto.

We claim:

1. An antenna interface system interposed between an antenna and an antenna controller comprising, input and output means, antenna driving means associated with said antenna, wherein said input means are connected to selectively supply digital input signals derived from digital control signals supplied by said antenna controller to said antenna driving means, and said output means are connected to selectively supply digital output signals to said antenna controller which output signals are representative of the status of said antenna, feedback means connected from said antenna driving apparatus to said output means to supply feedback signals to said output means which are representative of the status of said antenna driving apparatus, and control means connected to said input means and to said output means to selectively permit said digital input signals to be supplied to said antenna driving means and said digital output signals, to be supplied to said antenna controller on a mutually exclusive basis.

2. The system recited in claim 1 comprising transmission means which comprises signal detection means connected to selectively supply status signals to said output means for transmission to said antenna controller.

3. The system recited in claim 2 wherein said transmission means comprises multiplexer means connected to receive said status signals from said signal detection means and said feedback means and to selectively supply said status signals to said output means.

4. The system recited in claim 1 comprising, synchro multiplexer means which receives azimuth signals and elevation signals from said antenna driving apparatus to represent the position of said antenna driving apparatus.

5. The system recited in claim 4 wherein, said feedback means includes synchro-to-digital converter means for converting said azimuth and elevation signals from said synchro multiplexer to digital signals.

6. The system recited in claim 2 wherein, said signal detection means includes analog multiplexer means for selecting which of said status signals is to be provided to said output means.

7. The system recited in claim 6 comprising, analog-to-digital converter means for converting the analog status signals from said analog multiplexer means to digital signals.

8. The system recited in claim 1 comprising, means connected to the input of said input means and the output of said output means in order to transfer said digital input and output signals to and from said antenna controller.

9. The system recited in claim 1 comprising,
oscillator means connected with said control circuit to produce timing signals for the system.

10. The system recited in claim 5 comprising,
parallel-to-serial converter means connected between said synchro-to-digital converter means and said multiplexer means.

11. The system recited in claim 3 wherein, said multiplexer means includes at least one input terminal which is connected to a fixed reference signal so that said fixed reference signal is selectively supplied to said output means in order to establish a prescribed condition at said antenna controller.

12. The system recited in claim 1 wherein,
said input means comprises a line receiver circuit.

13. The system recited in claim 1 wherein,
said output means comprises a line driver circuit.

* * * * *